(12) United States Patent
Chen (10) Patent No.: US 9,729,684 B2
(45) Date of Patent: Aug. 8, 2017

(54) UNIFIED RETRACTABLE CASING SYSTEM FOR MOBILE DEVICES

(71) Applicant: Kingston Digital, Inc., Fountain Valley, CA (US)

(72) Inventor: Ben Wei Chen, Santa Ana, CA (US)

(73) Assignee: Kingston Digital, Inc., Fountain Valley, CA (US)

(*) Notice: Subject to any disclaimer, the term of this patent is extended or adjusted under 35 U.S.C. 154(b) by 0 days.

(21) Appl. No.: 14/876,645

(22) Filed: Oct. 6, 2015

(65) Prior Publication Data

US 2017/0099372 A1    Apr. 6, 2017

(51) Int. Cl.
*H04M 1/02* (2006.01)
*H04B 1/3888* (2015.01)

(52) U.S. Cl.
CPC ........ *H04M 1/0202* (2013.01); *H04B 1/3888* (2013.01)

(58) Field of Classification Search
CPC .. H04M 1/026; H04M 1/72527; H04B 1/385; H04B 1/3822; H04B 1/3877; H04W 72/0446; H04W 24/06; H04W 64/00; G09G 5/003; G06F 3/005; G06F 3/041; H05K 5/06
USPC ....... 455/575.8, 575.3, 16, 250; 379/433.13; 16/250; 429/96
See application file for complete search history.

(56) References Cited

U.S. PATENT DOCUMENTS

| | | | |
|---|---|---|---|
| 7,058,176 B2 * | 6/2006 | Chen | H04M 1/0216 379/433.13 |
| 8,367,235 B2 | 2/2013 | Huang | |
| 8,971,039 B2 | 3/2015 | Huang et al. | |
| 2009/0186264 A1 * | 7/2009 | Huang | H01M 2/1022 429/96 |
| 2013/0169564 A1 | 7/2013 | Sano et al. | |

FOREIGN PATENT DOCUMENTS

| | | |
|---|---|---|
| GB | 2434275 A | 7/2007 |
| KR | 10-2012-0134364 A | 12/2012 |
| KR | 101459357 B1 | 11/2014 |
| WO | 2014/133299 A1 | 9/2014 |

OTHER PUBLICATIONS

Combined Search and Examination Report from the GB Application No. GB1601444.1 mailed Apr. 28, 2016.
Spatially Distributing monthly reference evapotranspiration and pan evaporation considering topographic influences, Journal of Hydrology (2007) 338, pp. 196-220.

* cited by examiner

*Primary Examiner* — Phuoc H Doan
(74) *Attorney, Agent, or Firm* — Brundidge & Stanger, P.C.

(57) ABSTRACT

The present invention provides for, in one or more embodiments, a casing system for a mobile device. The system includes an upper cover, a lower cover and a hinge mechanism providing for both axial movement and radial movement of the upper cover in relation to the lower cover. The system enables a user to have improved protection of the mobile device while also being able to better insert, remove and secure their mobile device in the present invention. The present invention provides for a unified retractable casing system which is easier to use, provides improved protection and yields a unified structure.

18 Claims, 10 Drawing Sheets

UNIFIED RETRACTABLE CASING SYSTEM FOR MOBILE DEVICES

FIELD OF THE INVENTION

The present invention relates generally to enclosure systems for mobile devices and more particularly to providing a retractable casing system for a cellular phone.

BACKGROUND

Mobile devices have become ubiquitous in everyday life. As mobile capabilities permeate many traditional devices, new devices having cellular connectivity are improving their dimensional utility becoming more convenient for many users. Mobile devices including smart phones, cellular phones, geo-positional systems (GPS), tablets and notebooks are some examples of mobile devices that are used by various users, for business or personal use. With the advancement in the technological capabilities and complexities of mobile devices, the need to provide physical protection to one's mobile device, protecting it from impact, damage, environmental and/or other physical adversity, is also increasing. Additionally, with the proliferation of mobile devices, users may also seek to distinguish their mobile device from another's by utilizing a casing or protection system which provides for unique labeling, colors, shapes or other visual identifiers.

While various protective cases have been designed for some mobile phones, many of the case designs are difficult to use, lack convenience in utility and may have restrictions for users who have dexterity limitations or other physical limitations. Other case designs are not physically protective, such as those involving peels and flexible covers for the mobile phones. Still other case designs are often overly rigid for a normal user when it becomes challenging and difficult to remove a phone from a protective case.

Some objectives of a convenient and purposeful casing system for a mobile device are preferably that it should: a) provide convenience and ease in use; b) be convenient and reasonably straight-forward to situate the cell phone into; c) provide a secure and reliable fit to a secured cell phone; d) be convenient and reasonably straightforward to remove the cell phone readily without risk of damage to a user or the physical cell phone; and e) be provide reasonable protection to the cell phone.

Based on these objectives, most of the casing systems in the market today fall short of the suite of requirements. For instance, many existing cases provide a molded shell of which the cell phone is to be torque and/or twisted into; these movements and requirements often cause a user to difficulty, especially one with limited or affected hand flexibility and dexterity. Similarly, where a user has mis-fitted his cell phone into the case (i.e., where the cell phone has been inserted upside down such that the camera is not aligned with the camera hole in the case, for instance), a user is required to unseat his cell phone and re-situate it into the case the right way; during this process, a user may again be challenged, be possibly injured or inconvenienced, or damage the cell phone or the case in repositioning it. In other situations, where a user has a poorly crafted case or has frequently removed and replaced the cell phone into a case, often the cell phone's seating in the case is no longer secure and the cell phone may inadvertently be released from the case unexpectedly. The security of the seating of the cell phone is an integrity aspect which a user is dependent upon.

Further, the combined objectives of providing for a secure fit and being protective, also require that a case be able to withstand a reasonable drop height such that common impacts do not damage the cell phone or the case. These combined objectives are often in conflict with other combined objectives which provided for a good user experience, including convenience. For instance, in today's market, users often find that their experience provides for generally one or no more than two of the objectives above; user experiences are more likely to indicate that it is difficult to find a case which provides for being reasonably simple to put on, providing for an initially and repeatably secure fit, and providing for an simple removal technique. Typically, in the present market, if one casing system is very easy to put on and provides for a secure fit, it usually is very difficult to take off. Similarly, where a case is very easy to put on and easy to take off, it usually does not provide for a secure fit.

Figure 1:
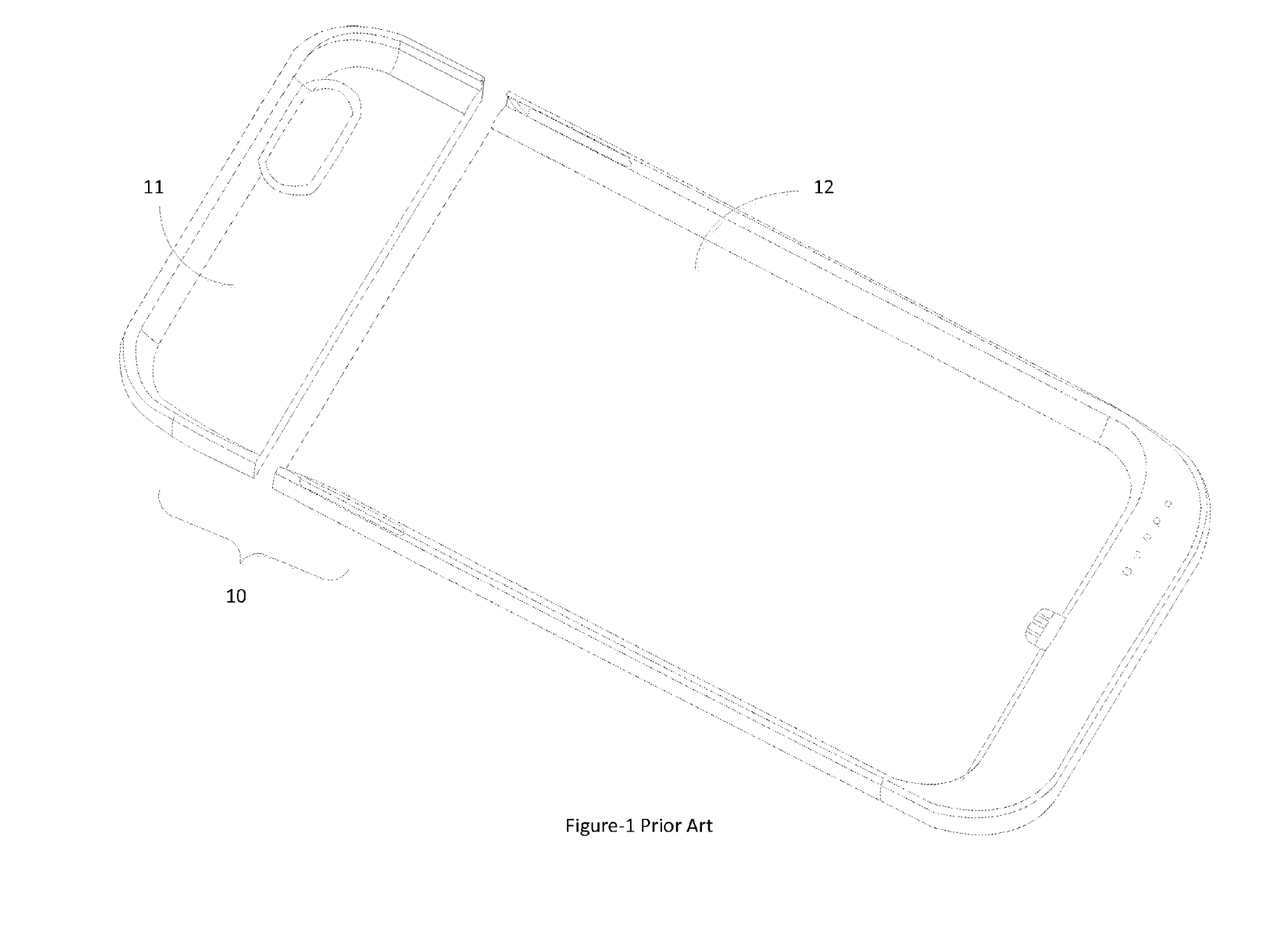
FIG. 1 shows an example of an existing case for a mobile device.

FIG. 1 shows an example of an existing case 10 for a mobile device. The existing case 10 depicts a case having two pieces with a top portion 11 for the upper end of a phone and a bottom portion 12 for the primary part of the phone. In operation, the top section 11 is seated against the bottom section 12, and slides onto the bottom section 12 through the open side end. A cell phone (not shown) may be inserted into bottom section 12 and then the top section 11 may be slid onto the top section of the phone. Similarly, once the top section 11 is removed by sliding away from the bottom section 12, the cell phone can be removed from the bottom portion 12.

While the exemplar case of FIG. 1 is more convenient than a traditional molded casing consisting of a unitary design, the exemplar case remains inconvenient and challenging for the reasons previously set forth above. For instance, the two-piece arrangement with a top section 11 and a bottom section 12 may inadvertently become separated where the resulting single piece becomes an ineffective case; additionally, during a normal impact, once of the portions may separate from the cell phone thereby leaving the cell phone unprotected; and further, the wearability of the two distinct pieces will occur at different rates if the user primarily removes the top portion.

It is therefore desirable to improve on cases and casing systems that are utilized to overcome the challenges set forth above. It is also desirable to provide for an improved unified casing system which may achieve the objectives discussed above and improve over the existing limitations. Therefore, it is advantageous to achieve a solution that overcomes the aforementioned issues.

SUMMARY

The present invention addresses such a need. The present invention provides for, in one or more embodiments, a casing system for a mobile device comprising an upper cover, a lower cover and a hinge mechanism providing for axial movement and radial movement of the upper cover in relation to the lower cover is provided. The system includes a hinge mechanism having a first assembly configured for an interior portion of the upper cover and a second assembly configured on a first edge of the lower cover. Preferably, the first assembly and the second assembly are dimensionally arranged for the second assembly to be received by the first assembly and secured with a locking bar.

The present invention provides for, in one or more embodiments, a protective enclosure for a mobile device comprising an upper cover, a lower cover and a hinge mechanism. Preferably the upper cover and the lower cover are arranged to be in mechanical communication. The hinge mechanism of the present invention provides both for axial movement bidirectionally of the upper cover in relation to the lower cover and radial rotational movement of the upper cover in relation to the lower cover.

The present invention provides for, in one or more embodiments, a mobile device protection system comprising an upper cover having an inner upper cover and an outer upper cover, a lower cover and a hinge mechanism providing for axial movement and rotational movement of the upper cover in relation to the lower cover. Into one or more preferred embodiments, the hinge mechanism includes a first assembly positioned on the inner upper cover and a second assembly including a hinge joint. The hinge joint, preferably, is capable of receiving a locking bar affixed to a first edge of the lower cover proximate to a first edge of the upper cover. Further, the first assembly and the second assembly are preferably rotatably joined and in mechanical communication by a locking bar.

DETAILED DESCRIPTION

The following description is presented to enable one of ordinary skill in the art to make and use the embodiments of the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention relates generally to enclosure systems for mobile devices and more particularly to providing a retractable casing system for a cellular phone having a unified operation. As set forth in FIG. 2, according to the current invention, six states of insertion operation (20A-20F) and six states of removal operation (20A-20F) for the present invention of the unified retractable casing system for a mobile device, are depicted.

Figure 2:
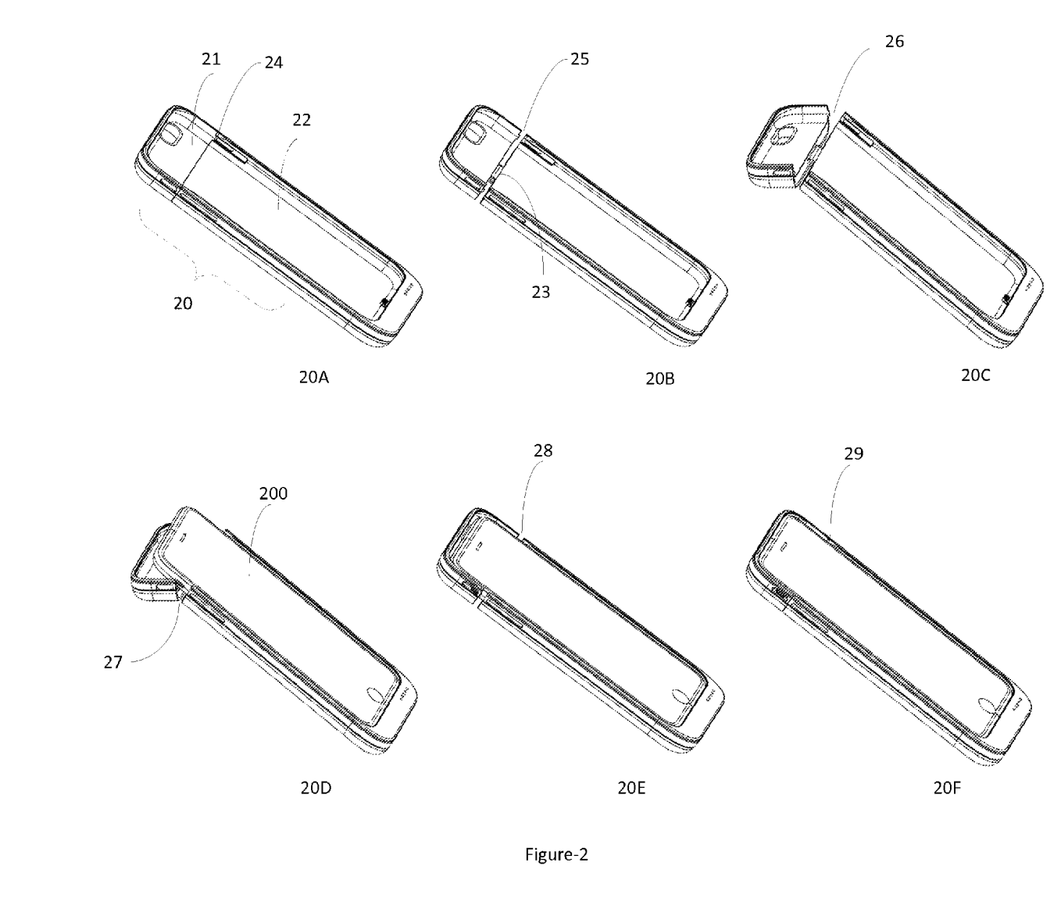
FIG. 2, in accordance with one or more embodiments of the invention, shows six states of operation regarding insertion and removal of a unified retractable casing system for a mobile device.

From FIG. 2, a unified retractable casing system 20 for a mobile device 200 is depicted at cover-close state 20A. The unified device is arranged to be configured as a single, unified retractable casing system which operates as though it was a single piece with flexible characteristics. In particular, though the device is comprised of a plurality of sub-assemblies and/or components, the resulting unified device generally has three main portions, as further depicted in FIG. 2: an upper cover 21 (see 20A), a lower cover 22 (see 20A), and a hinge mechanism 23 (see 20B). The hinge mechanism 23 is present in the device of 20A but is not visible as the upper cover 21 is situated as seated with the lower cover 22, rendering the hinge mechanism to be no visible, in a preferred embodiment, from the perspective of 20A. Further details of the hinge mechanism 23 are set forth below and with regard to FIG. 3 and FIG. 4.

From FIG. 2, the six states of operation of the present invention are depicted. At 20A, the present invention is arranged to be in the cover-close state, where the upper cover 21 and the lower cover 22 are arranged to be in contact with one another via the internal hinge mechanism 23 (not shown). At 20A, the present invention is exclusive of a mobile device situated within. More particularly, the cover-close state can be visually determined by the contact point shown at 24 where the upper cover 21 and the lower cover 22 are in contact with one another, in a fully closed position, without a mobile device. In one or more preferred embodiments, when the upper cover 21 and the lower cover 22 are arranged to be completely in a closed position, the two parts form a seam in between along their respective edges when in contact. Operatively, 20A depicts a close state for the present invention.

To operate the present invention from the cover-close state of 20A to an insertion-pull-out state, as depicted at 20B, the upper cover 21 is pulled outward from the lower cover 22 and thereby exposes, at least in part, the hinge mechanism 23. This state is visually determinable as the insertion-pull-out state and may be visually inspected at 25. In one or more preferred embodiments, the insertion-pull-out state may provide for arrangements of the device where the upper cover may be separated at varying distances from the lower cover, thereby visually allowing for portions or the entirety of the hinge mechanism to be observable. In such arrangements, these embodiments provide for the upper cover to be pulled away from the lower cover from a minimal distance to a maximum distance whereby the maximum separation as between the two portions is the maximal length of the insertion-pull-out state.

To operate the present invention from the insertion-pull-out state of 20B to an insertion-bend-down state, as depicted at 20C, the upper cover 21 is bent downward after being extended away from the lower cover 22, thereby maintaining the exposure of the hinge mechanism visually, as visually set forth at 26. In the insertion-bend-down state, the present invention is arranged to accept the insertion of a mobile device (shown as 200 in 20D).

The present invention is operative to accept for insertion a mobile device 200 at 20D, depicted as the inserted state, visually determinable at 27. At this state, though the mobile device is inserted into the lower portion 22, the mobile device is not fully seated nor secured with the present invention. Further steps are required in order to secure the inserted mobile device with the present invention. As used herein, the inserted state of 20D may be used interchangeably with 'removal state' where a similar physical orientation of the present invention is required to remove the mobile device from the present invention, as further described herein.

Once the mobile device is inserted into the lower portion 22 of the present invention, the upper cover 21 is then operatively positioned to return to a position in which is aligned with the lower cover 22; in a preferred embodiment, the upper cover 21 is bent upwards towards its original position of 20B, to achieve a insertion-bend-up state at 20E, as is visually determinable at 28. Once the upper cover is aligned with the lower cover, having first seated the mobile device within the lower cover, the combination of the present invention and the mobile device are ready to be securely seated.

At 20F, the present invention is arranged from the bent-up state of 20E to the device-secure state (also used herein as the insertion-push-down state or close state) of 20F. To operate the device from 20E to 20F, in one or more preferred embodiments, first the upper cover 21 is aligned with the lower cover and the upper cover is pressed or pushed towards the lower cover. As the upper cover is pressed into contact with the lower cover, creating the seam described in 20A though not visually viewable at 20F due to the presence of the mobile device 200, the mobile device is then secured and seated into the present invention. The upper cover 21 being arranged with the lower cover 22 is visually determinable at 29. When the upper cover and lower cover are finally positioned in contact with one another with the mobile device within the present invention, the combination is complete and the mobile device is securable situated with the present invention (i.e., device-secure state or close state). Once the mobile device is situated with the present invention in the device-secure state, a user may securely use the mobile device or may then elect to remove the mobile device by returning to the removal-pull-out state or similar.

To remove the mobile device from the device-secure state of 20F, the upper cover is pulled away from the lower cover, as in pull-out state 20E. As soon as the removal-pull-out state 2E reaches the maximal length, the upper cover can then be bent downward, as in removal-bend-down state 20D. The mobile device accommodated and enclosed by the lower cover may then be readied to be removed from the casing system, as depicted at device-removal state 20C; as used herein, the insert-device-on state 20D is similar to a device-removal state 20C in that the upper cover is bent downward from the axis of the mobile device for both actions where the physical state of the present invention appears similar for both activities. Once the mobile device is removed, the case may be bent-up as in 20B removal-bend-up 20B state, and pushed down and closed as in 20A cover-close state (or removal-push-down state), or may remain open awaiting further mobile device insertion.

Figure 3:
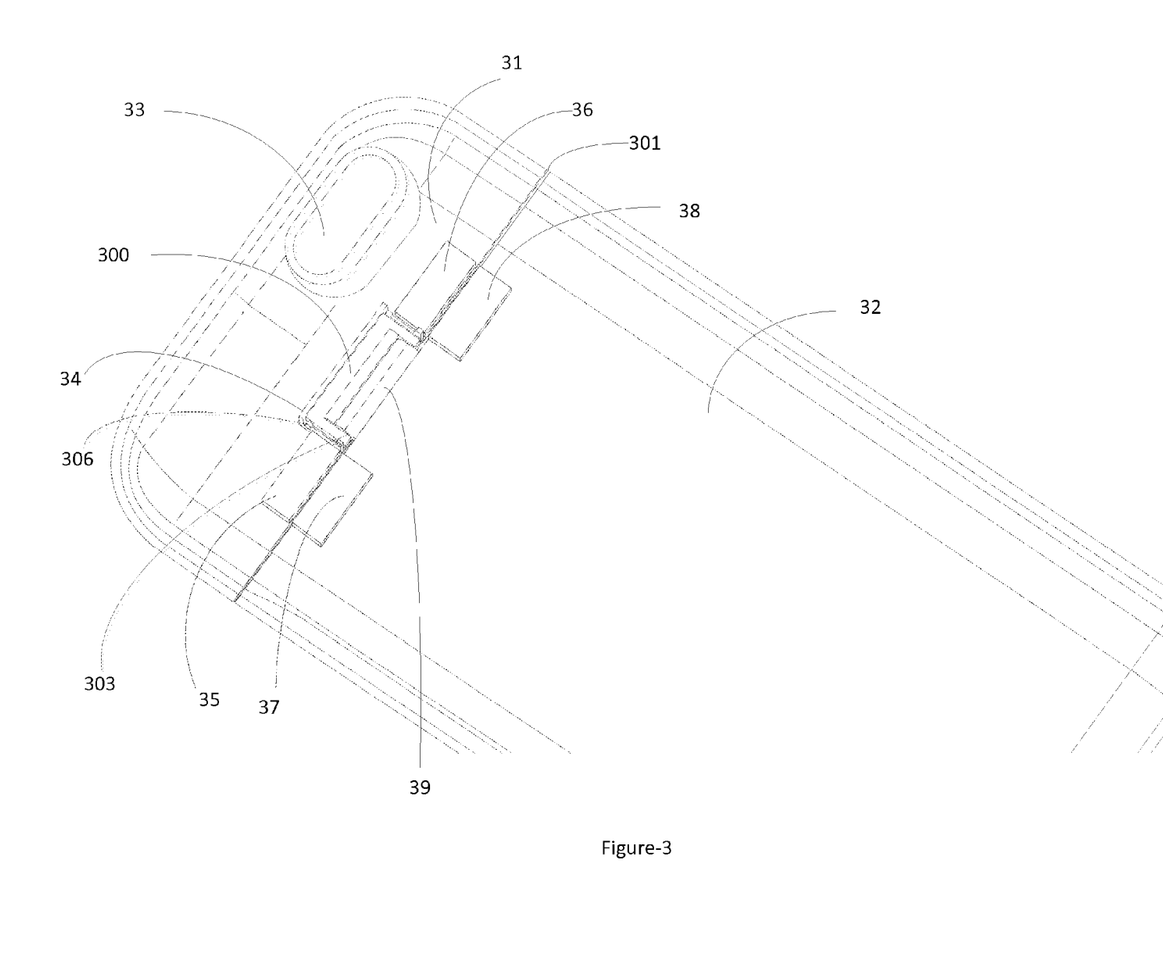
FIG. 3, in accordance with one or more embodiments of the invention, sets forth a top view of the internal structure of the inner upper cover, inner lower cover, and the hinge mechanism of the present invention, in a insertion state of any of cover-close, insertion-pull-out, insertion-bend-down, device insertion, insertion-bend-up, device secure (insertion-push-down); and in a removal state of any of device secure, removal-pull-out, removal-bend-down, device removal, removal-bend-up, cover-close (removal-push-down)

FIG. 3, in accordance with one or more embodiments of the invention, sets forth a top view of the internal structure of the inner upper cover, inner lower cover, and the hinge mechanism of the present invention, in a state of any of cover-close 20A, removal-push-down 20A, device-secure 20F, insertion-push-down 20F.

From FIG. 3, in one or more preferred embodiments, an arrangement 399 of components of the present invention is set forth. In one embodiment, an inner upper cover 31, an inner lower cover 32 and a hinge mechanism in the cover-close 20A, removal-push-down 20A, device-secure 20F or insertion-push-down 20F state, visually determinable at the seam of 301. The inner upper cover 31 may include the cavity opening 33 for camera, buttons, and other exposable physical functions of the mobile device. The hinge mechanism includes a guide rail system 34, a slider hinge 300, a hinge joint 39, a fixed axis bar 306, a hinge bar (not shown) secured by a locking mechanism 303, two magnets 35 and 36 associated with the inner upper cover 31, and two magnets 37 and 38 associated with the inner lower cover 32. When the upper cover and the lower cover are fully in cover-close 20A, removal-push-down 20A, device-secure 20F, insertion-push-down 20F state, the upper cover and the lower cover form a seam in-between 301 at their respective contacts.

Further from FIG. 3, in accordance with one or more preferred embodiments, the first corresponding pair of magnets 35 and 37 and the second corresponding pair of magnets 36 and 38, are positioned such that when the upper cover and lower cover are in cover-close 20A, removal-push-down 20A, device-secure 20F, insertion-push-down 20F state, the respective magnet pairs are aligned and aid in closing the seam in-between 301 between the upper and lower covers.

Figure 4:
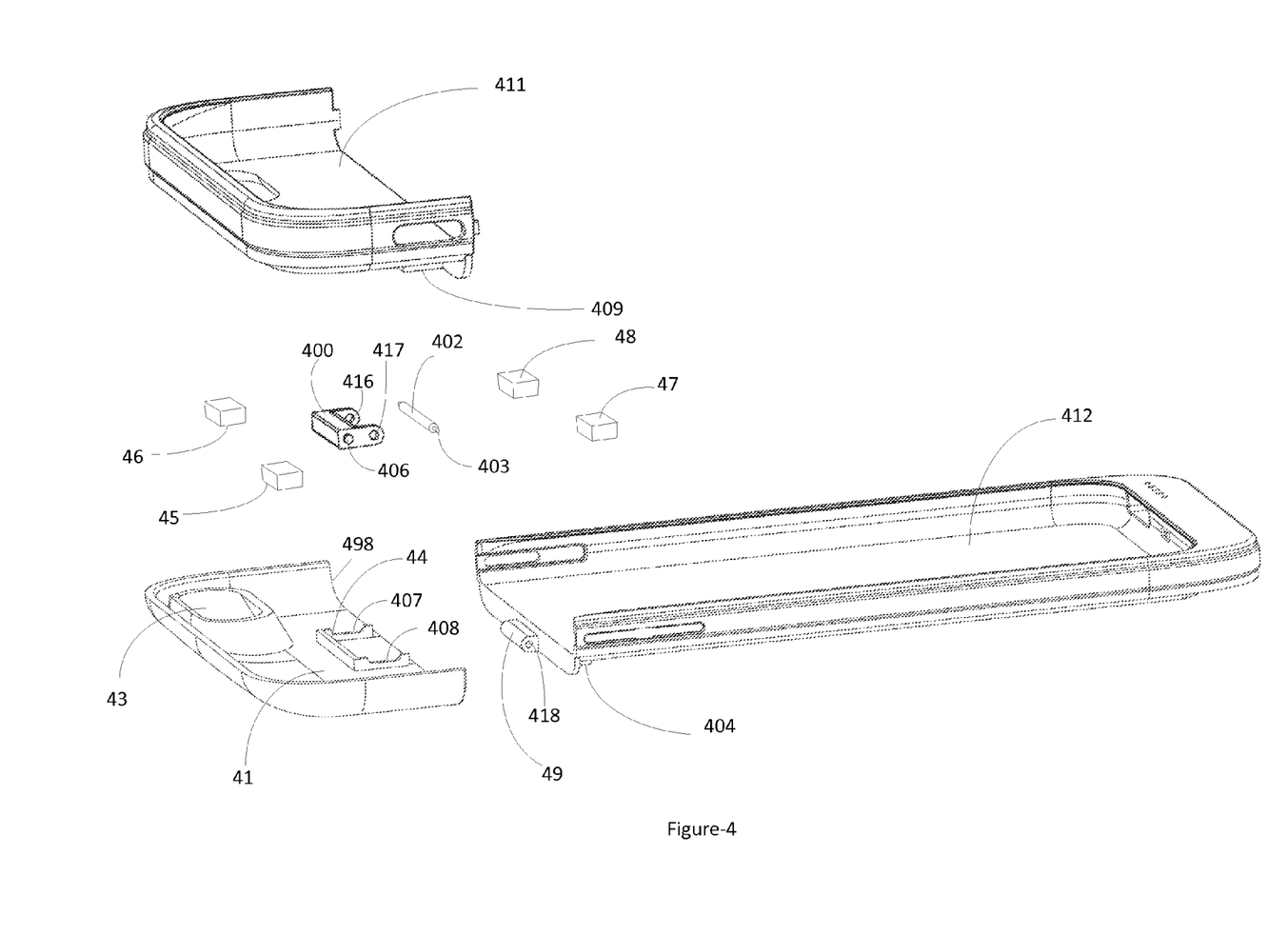
FIG. 4, in accordance with one or more embodiments of the invention, depicts certain aspects of the unified retractable casing system of the present invention.

FIG. 4, in accordance with one or more embodiments of the invention 499, depicts certain aspects of the unified retractable casing system of the present invention. From FIG. 4, additional component arrangement and/or inclusion, for one or more preferred embodiments of the present invention, is depicted.

From FIG. 4, one or more preferred embodiments of a unified retractable casing system of the present invention is depicted. Provided is an inner upper cover 41 with a cavity opening 43, a guide rail system 44 having two rails (407, 408) proximate to the upper cover edge 498. Also depicted is a mating outer upper cover 411 which is preferably arranged to be assembled onto the inner upper cover 41. Preferably, the outer upper cover 411 would be assembled with the inner upper cover 41 following installation of the associated hinge mechanism, further described herein.

Also from FIG. 4, a plurality of magnets are depicted. Magnets 45 and 46 are mounted into the magnet placement system 409 of the outer upper cover 411. In one or more alternative arrangements, the magnets 45 and 46 may alternatively be mounted on the inner upper cover 41 (not shown). Magnets 47 and 48 are mounted into the magnet placement system 404, preferably either on the outer portion of the lower cover 412 or on the inner upper cover (placement not shown).

From FIG. 4, a slider hinge 400 includes a fixed axis bar 406 and two holes 416 and 417 for receiving a hinge bar 402. A hinge joint 49 is fabricated on to the body of the outer lower cover 412. The hinge joint 49 is preferably proximate to the lower cover 412 having a preferably cylindrical cavity 418 running through the length of the hinge joint body 49. Preferably, the length of the hinge joint 49 is associated to be adaptively mated with the body of the slider hinge 400 such that the length of the hinge body joint enables its placement to be within the slider hinge 400 and aligned with the holes 416, 417. A hinge bar 402 has locking mechanism 403 for use to link the slider hinge 400 and the hinge joint 49, linking the combination in place such that movement may still occur along the joint where the upper cover may pivot from the lower cover.

Figure 5:
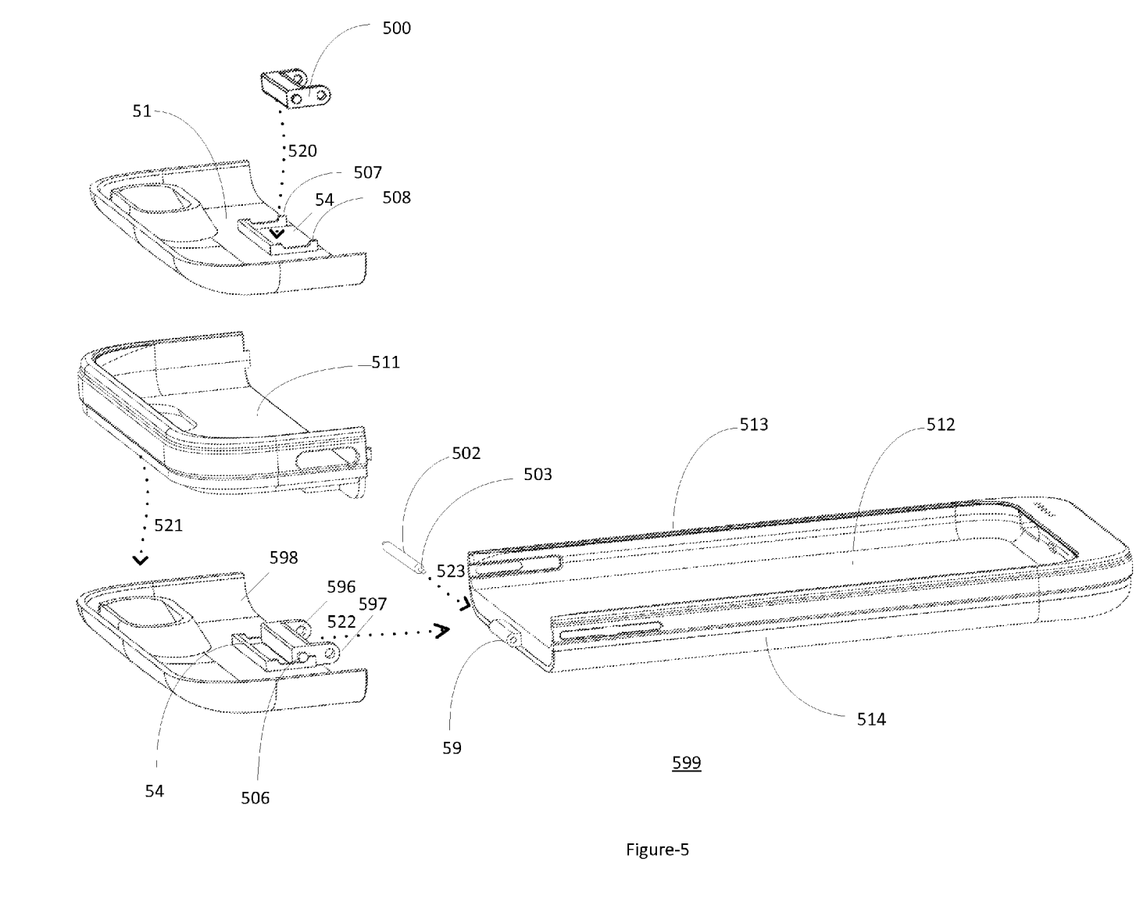
FIG. 5, in accordance with one or more embodiments of the invention, depicts assembly sequences for the hinge mechanism of the present invention.

FIG. 5, in accordance with one or more embodiments of the invention, depicts assembly sequences 599 for the hinge mechanism of the present invention. From FIG. 5 a slider hinge 500 is arranged for positioning onto the guide rail system 54, at 520. The fixed axis bar 506 is placed against the outer end of the two rails 507 and 508, also at 54, such that one end of the slider hinge 500 protrudes over the upper cover edge 598, with two holes (596, 597) exposed over the edge 598.

Also from FIG. 5, in one or more preferred embodiments, the outer upper cover 511 is assembled on top of the inner upper cover 51, at 521. The joint piece of the outer upper cover 511 and the inner upper cover 51 is then mated with the hinge joint 59 on the lower cover 513, at 522. The hinge bar 502 is then aligned and positioned through the cavity holes of the slider hinge 500 and the hinge joint 59. The hinge bar 502 is then secured with the locking mechanism 503, at 523. The inner lower cover 514 may be mated to the outer lower cover 512 to form the lower cover 513, independently during the above mentioned sequences.

Figure 6:
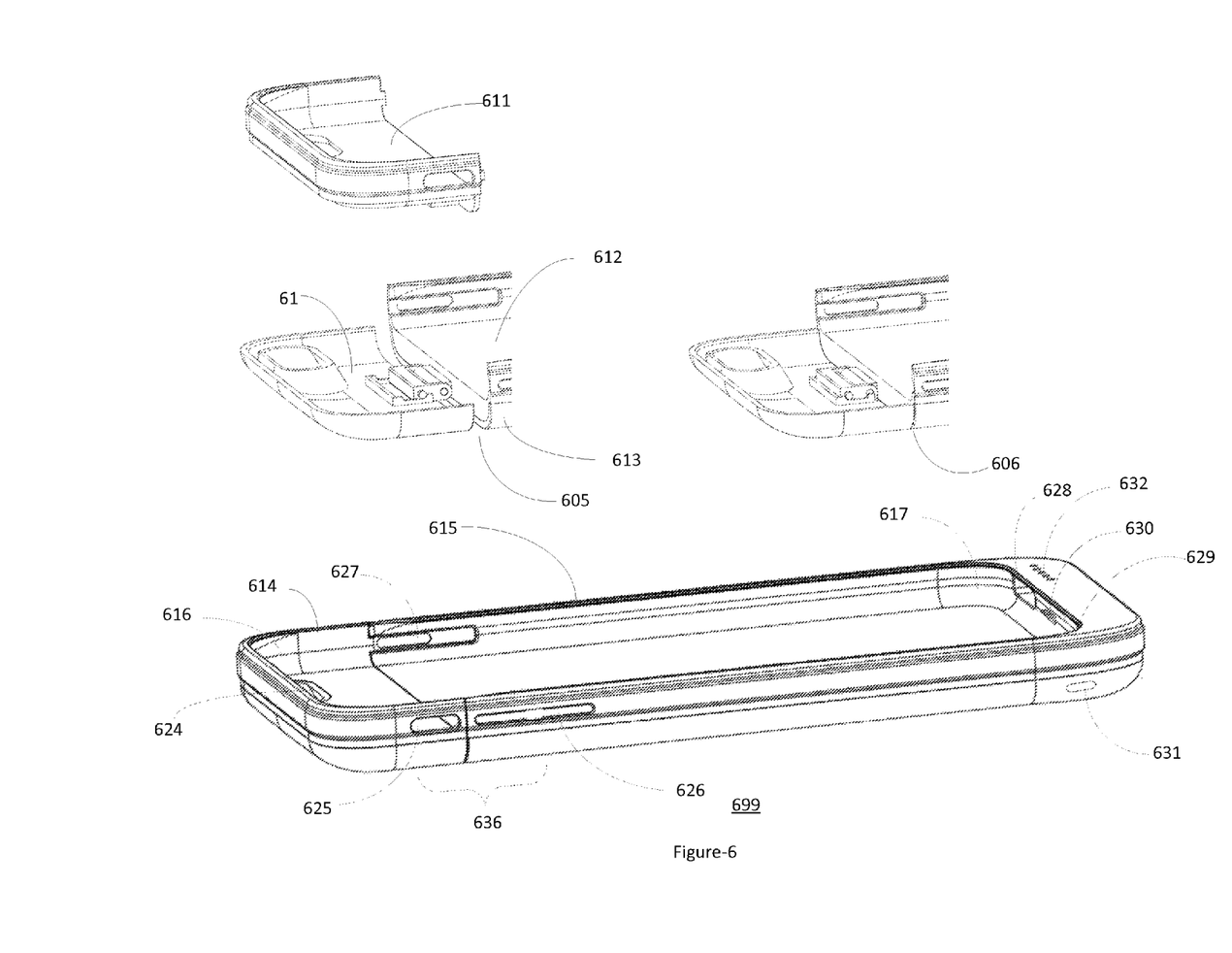
FIG. 6, in accordance with one or more embodiments of the invention, depicts the top-view after assembly of the present invention in the cover-close, removal-push-down, device-secure or insertion-push-down state.

FIG. 6, in accordance with one or more embodiments of the invention, depicts the top-view 699 after assembly of the present invention in the cover-close 20A, removal-push-down 20A, device-secure 20F or insertion-push-down 20F state. From FIG. 6, an upper cover 614, lower cover 615, hinge mechanism and the unified retractable casing system 636, in the states defined above is depicted. The outer upper cover 611 and the inner upper cover 61 forms the upper cover 614. The outer lower cover 612 and the inner lower cover 613 forms the lower cover 615. By example, the insertion-pull-out state 605 shows that the upper cover 614 is pulled away from the lower cover 615. By further example, the cover-close or insertion-push-down state 606 shows that the upper cover 614 is pushed down and into the lower cover 615.

Further from FIG. 6, the unified retractable casing system, in accordance with one or more preferred embodiments, further includes grooves (616, 617), cavity openings (625, 626, 627, 628, 629), connector 630, external connector 631, and display 632. Preferably, grooves 616 and 617 may be used to securely accommodate and fit a mobile device; cavity openings 625, 626, 627, 628, 629 may be included for associative positioning to provide for use of a mobile device's camera, buttons, audio, and other exposable functions; connector 630 may be present to provide connectivity to the mobile device; connector 631 may be included to provide connectivity to an external device for charging or computing; a status display 632 may be present for displaying information of relevance to the user about the device, mobile device or system (e.g., alarm, lights, operations, connectivity, usage, etc. in one form or another).

In one or more preferred embodiments, the compartment space depicted in FIG. 6, between the outer lower cover 612 and the inner lower cover 613 may accommodate a variety of components, including battery, charging electronics, communication device, networking device, computing device, health care device, sensors, gaming device, and storage device; as used herein, a mobile device in the context of the present invention may include any of these devices, alone or in combination, with cell phones, mobile phones, GPS systems, etc. as used herein as a mobile device. Further the compartment space between the outer upper cover 611 and the inner upper cover 612 may also accommodate the above mentioned components as those in the lower cover, if necessary.

Figure 7:
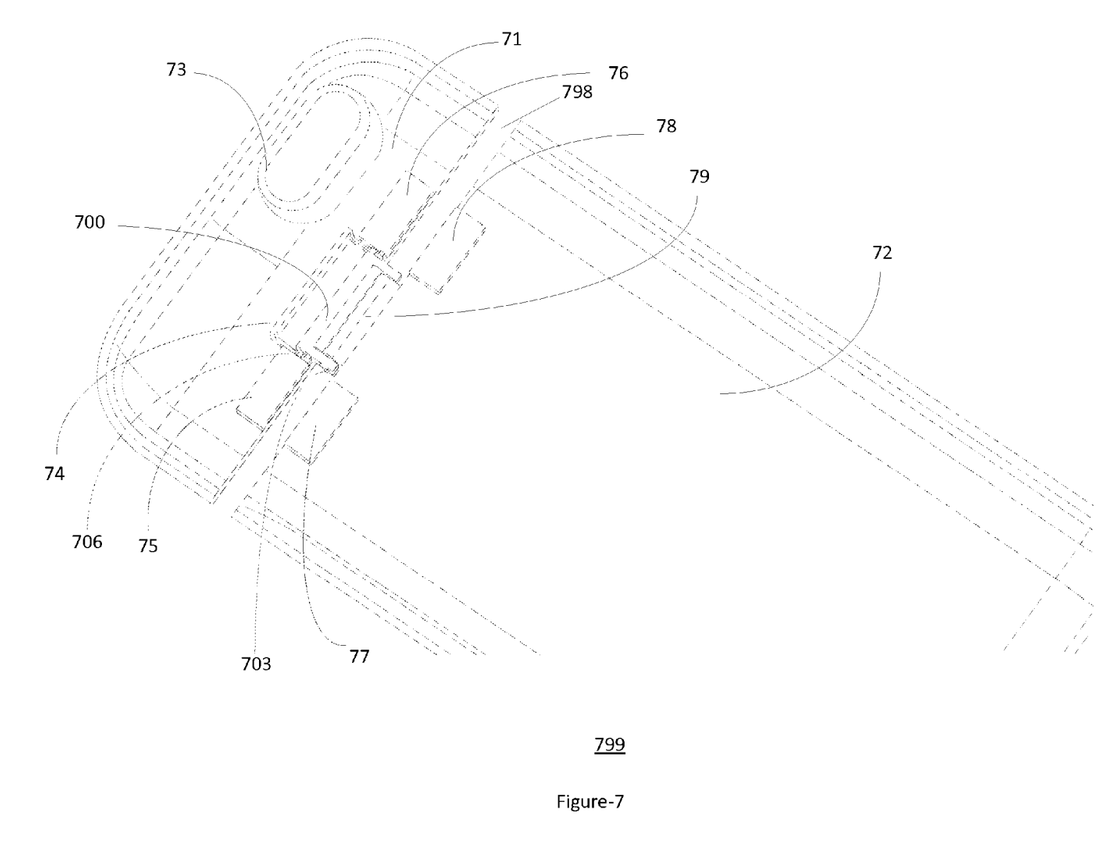
FIG. 7, in accordance with one or more embodiments of the invention, depicts a top-view of the internal structure of the present invention in an insertion-pull-out, removal bend-up, insertion-bend-up, removal-pull-out state.

FIG. 7, in accordance with one or more embodiments of the invention, depicts a top-view of the internal structure of the present invention 799 in an insertion-pull-out 20B, removal-bend-up 20B, insertion-bend-up 20E, removal-pull-out 20E state. From FIG. 7, depicted is an inner upper cover 71, inner lower cover 72, and a hinge mechanism arranged in an insertion-pull-out 20B, removal-bend-up 20B, insertion-bend-up 20E, removal-pull-out 20E state, in accordance with one or more embodiments of the present invention. The inner upper cover 71 may include the cavity opening 73 for camera, buttons, and other exposable functions of the mobile device, as previously discussed.

The hinge mechanism preferably includes a guide rail system 74, a slider hinge 700, a hinge joint 79, a fixed axis bar 706, a hinge bar (not shown) secured by a locking mechanism 703, though other arrangements are also expected under the present invention. FIG. 7 also presents two magnets 75 and 76 (each associated with the upper cover 71) and two magnets 77 and 78 (each associated with the lower cover 72). When the present invention is configured to be arranged in a removal-bend-up 20B, insertion-bend-up 20E, removal-pull-out 20E state, a gap appears at 798 between an edge of the inner upper cover and an edge of the inner lower cover.

Figure 8:
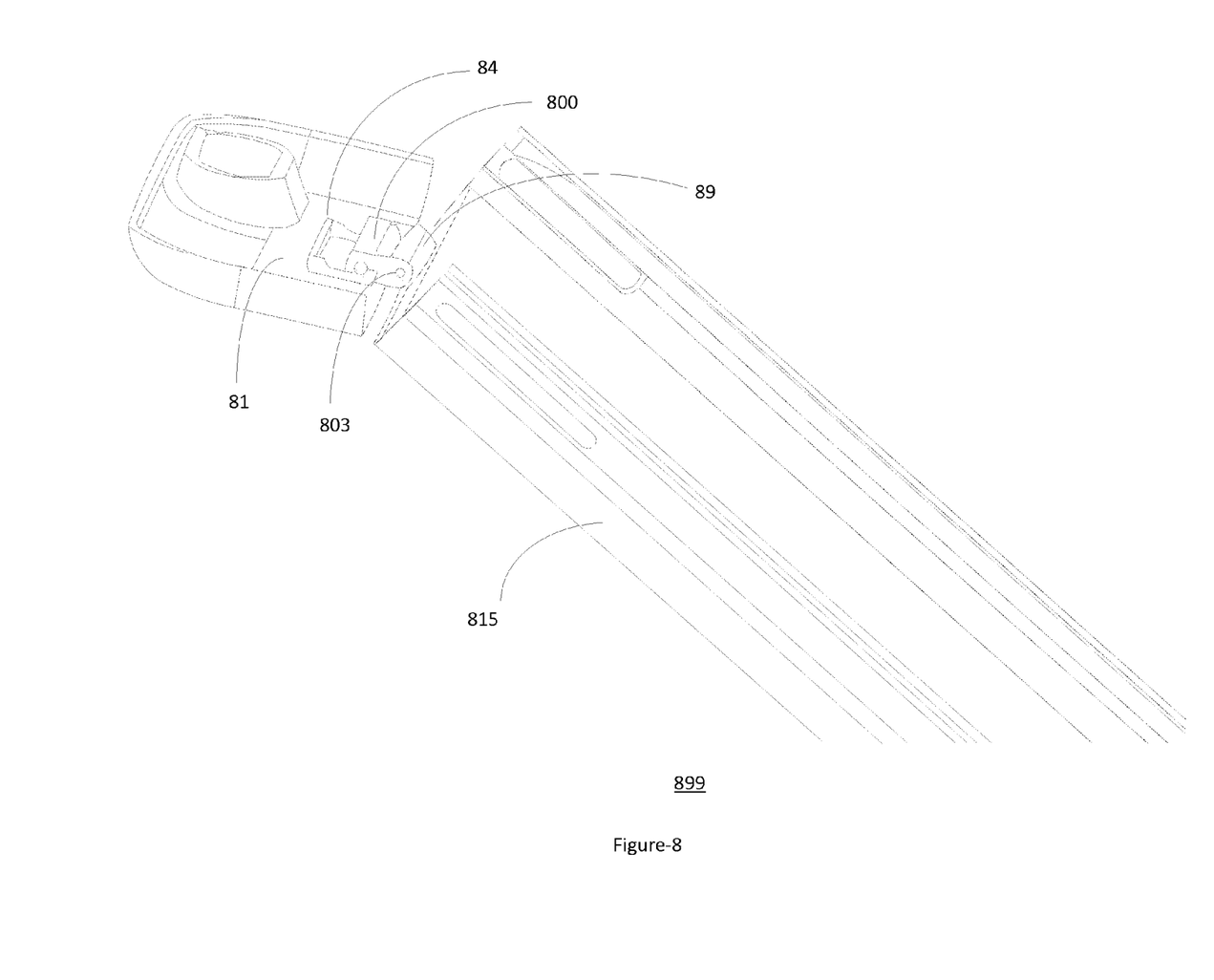
FIG. 8, in accordance with one or more embodiments of the invention, depicts a side-view of the general components internally arranged of the present invention in an insertion-bend-down state.

FIG. 8, in accordance with one or more embodiments of the invention, depicts a side-view of the general components internally arranged 899 of the present invention in a insertion-bend-down 20C, device-removal 20C, device-insertion 20D, removal-bend-down 20D state. From FIG. 8 a side-view of the general preferred internal structure of the unified carrier system is set forth. From FIG. 8, depicted is an inner upper cover 81, lower cover 815, and an associated hinge mechanism in a insertion-bend-down 20C, device-removal 20C, device-insertion 20D, removal-bend-down 20D state. In one or more preferred embodiments, the inner upper cover 81 includes a guide rail system 84 and is preferably mounted with a slider hinge 800 connected to a hinge joint 89 by a hinge bar (not shown) which is in turn secured by a locking mechanism 803.

The locking mechanism 803 provides for a secure fit between the inner upper cover and the lower cover, while enable the inner upper cover to rotate away or towards the lower cover when the combination are not in a close state. For instance, in the bend down state, the inner upper cover is rotatable positioned away or towards the lower cover in part due to the mechanical arrangement with the hinge joint 89 and locking mechanism 803.

Figure 9:
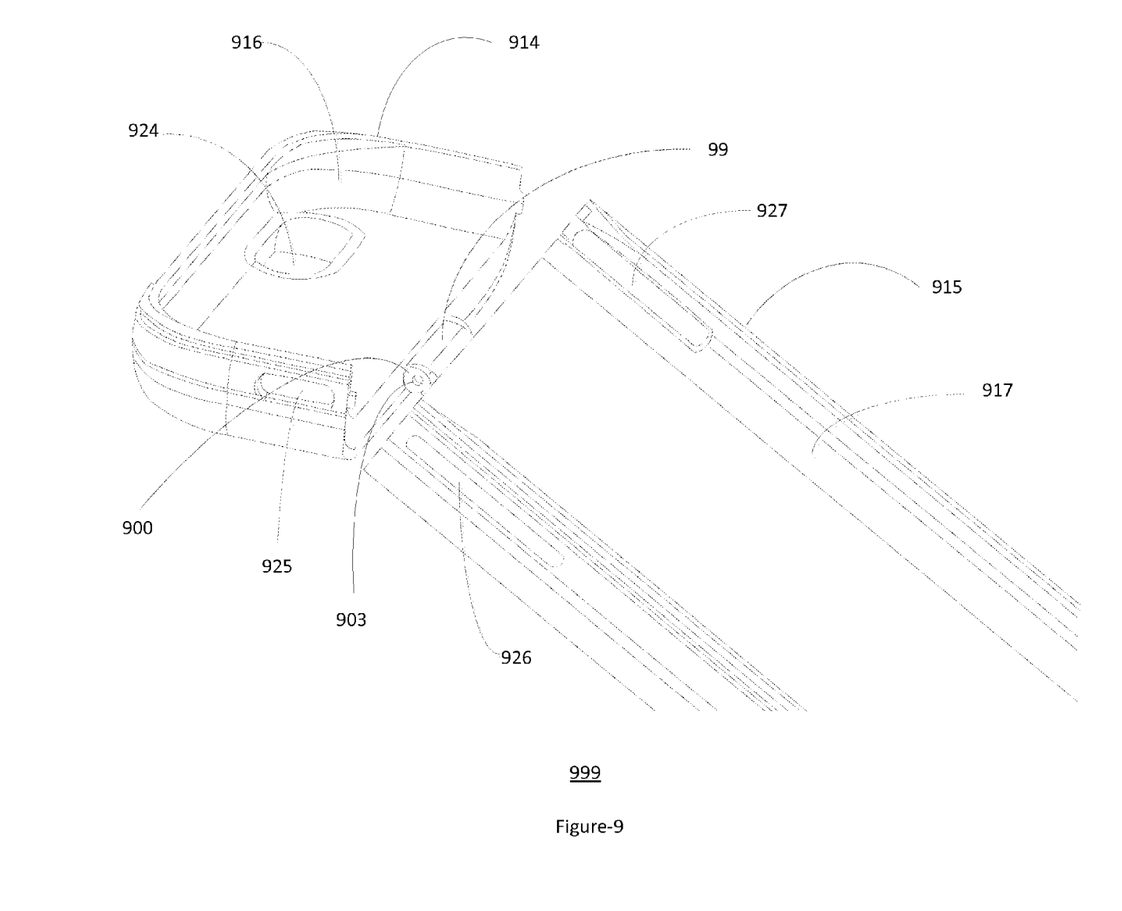
FIG. 9, in accordance with one or more embodiments of the invention, depicts a side-view of the present invention in an insertion-bend-down, device-removal, device-insertion, removal-bend-down state.

FIG. 9, in accordance with one or more embodiments of the invention, depicts a side-view 999 of the present invention in an insertion-bend-down 20C, device-removal 20C, device-insertion 20D, removal-bend-down 20D state. From FIG. 9, a general side-view of the structure of the present invention is depicted, including an upper cover 914, lower cover 915, and a hinge mechanism arranged and configured in a insertion-bend-down 20C, device-removal 20C, device-insertion 20D, removal-bend-down 20D state. Visually, in the bend down state, the hinge mechanism is exposed and includes part of two sides of the slider hinge 900, the mating hinge joint 99, and a locking mechanism 903 securing the hinge bar (not shown). Preferably, the upper cover 914 and the lower cover 915 also reconfigured to have grooves 916 and 917 to securely accommodate and fit a mobile device for insertion when the present invention in is a bend down state.

The upper cover 914 and the lower cover 915 also, in one or more preferred embodiments, have at least one and preferring a plurality of cavity openings, 924, 925, 926, and 927, for camera, buttons, audio, and other exposable functions of the mobile device, as previously presented herein.

Figure 10:
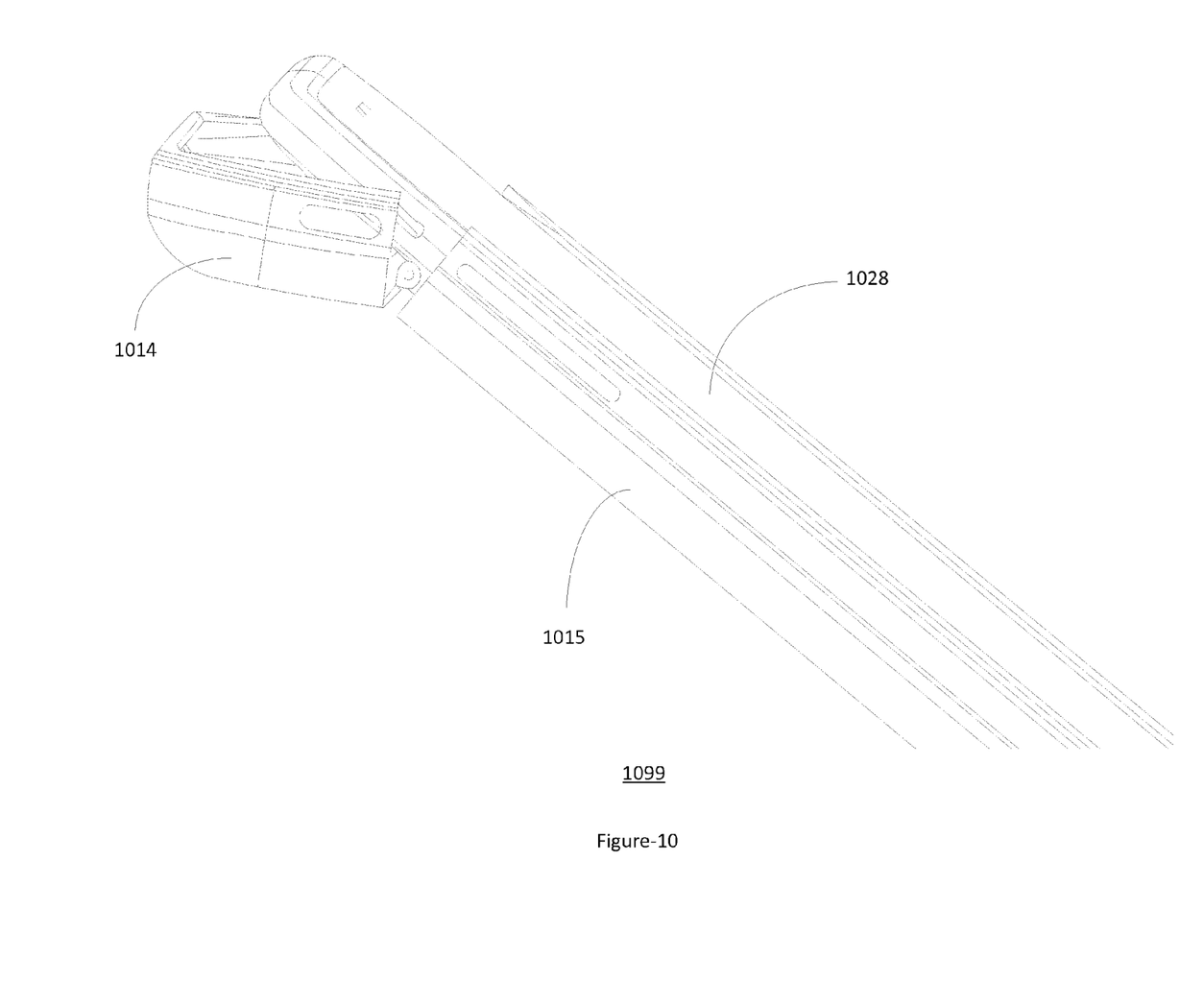
FIG. 10, in accordance with one or more embodiments of the invention, depicts a side-view of the present invention in an insertion-bend-down, device-removal, device-insertion, removal-bend-down state with a mobile device positioned within.

FIG. 10, in accordance with one or more embodiments of the invention, depicts a side-view 1099 of the present invention in a insertion-bend-down 20C, device-removal 20C, device-insertion 20D, removal-bend-down 20D state with a mobile device 1028 positioned within. From FIG. 10, a side-view of one arrangement of a structure of the upper cover 1014, lower cover 1015, a mobile device 1028, and the hinge mechanism in the insertion-bend-down 20C, device-removal 20C, device-insertion 20D, removal-bend-down 20D state, is presented. The insertion-bend-down 20C, device-removal 20C, device-insertion 20D, removal-bend-down 20D state is suitable for the insertion or removal of the mobile device 1028 from the unified retractable casing system.

It will be appreciated that the compartment space inside the unified casing system can accommodate a variety of components, including battery, charging electronics, communication device, networking device, computing device, health care device, sensors, gaming device, and storage device. It will be further understood that the variety of components may also be nested, integrated, combined or otherwise co-located with a mobile device as well. The present invention contemplates such utility in its operation and utilization.

It will be further appreciated that in embodiments presented herein, the length of the hinge joint is associatively related to the receiving opening of the slider hinge such that the two are arranged so as to be in communication and alignably positioned in place via a hinge bar. Preferably, once linked, the combined structures and components yield a locking mechanism providing for movement of the upper cover away or towards the lower cover both axially through the sliding hinge arrangement and rotationally from across the hinge joint which enables the upper cover to pivot therefrom.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

The invention claimed is:

1. A casing system for a mobile device comprising:
   an upper cover, comprising:
      an outer upper cover, and
      an inner upper cover;
   a lower cover; and
   a hinge mechanism providing for axial movement and radial movement of the upper cover in relation to the lower cover, the hinge mechanism including:
      a first assembly configured for an interior portion of the upper cover, the first assembly comprising:
         a slider hinge, and
         a plurality of guide rails configured on the outer upper cover, and
      a second assembly configured on a first edge of the lower cover, the second assembly comprising:
         a hinge joint being dimensionally configured to be in mechanical communication with the slider hinge and to receive a locking bar,
   wherein the first assembly and the second assembly are dimensionally arranged for the second assembly to be received by the first assembly and secured with the locking bar.

2. The system of claim 1, wherein the lower cover comprises:
   an outer lower cover; and
   an inner lower cover.

3. The system of claim 1, wherein the slider hinge further includes a fixed axis bar and two apertures for receiving a hinge bar.

4. The system of claim 1, wherein the slider hinge includes a first protuberance opposite a second protuberance and is dimensionally arranged with a plurality of sliding rails on the first assembly.

5. The system of claim 4, wherein the slider hinge is in mechanical communication with the sliding rails while the outer upper cover is affixed over the hinge mechanism and the lower upper cover.

6. The system of claim 5, wherein the first assembly is securably in mechanical communication with the second assembly via the locking bar.

7. The system of claim 5, wherein the hinge joint and the slider hinge are securably arranged and in communication via the locking bar.

8. The system of claim 7, wherein the upper cover and lower cover are in communication with each other, and the hinge mechanism provides for adjusting the upper cover both axially away from a minimum position to a maximum position and towards the lower cover from a maximum position to a minimum position.

9. The system of claim 8, wherein the hinge mechanism further provides for adjusting the upper cover both radially away from a close position to a maximum radial position and towards the lower cover from a maximum radial position to a close position.

10. The system of claim 9,
    wherein the close position is where a first edge of the upper cover is parallel and planar with the first edge of the lower cover, and
    wherein the maximum radial position is determined as a distance the upper cover rotationally traverses in relation to the hinge joint of the locking mechanism.

11. The system of claim 7,
    wherein the minimum position is where a first edge of the upper cover is in contact with the first edge of the lower cover, and
    wherein the maximum position is determined as a distance the plurality of protuberances traverse across their respective sliding rails.

12. A protective enclosure for a mobile device comprising:
    an upper cover,
    a lower cover
       wherein the upper cover and the lower cover are in mechanical communication with each other; and
    a hinge mechanism providing both for axial movement bidirectionally of the upper cover in relation to the lower cover and radial rotational movement of the upper cover in relation to the lower cover, the hinge mechanism comprising:
       an upper cover assembly comprising:
          a slidable locking mechanism,
          a plurality of rails for the slidable locking mechanism to slide on, and
          an outer upper cover positioned over the slidable locking mechanism; and a lower cover hinge joint affixed to the lower cover and in communication with the slidable locking mechanism by a locking bar.

13. The enclosure of claim 12, wherein the enclosure further includes one or more grooves configured within the lower cover and the upper cover to provide for seating of a mobile device therein.

14. The enclosure of claim 13, wherein the enclosure further includes a plurality of magnets configured in the upper cover and lower cover for providing improved operations of the upper cover in relation to the lower cover when inserting or removing a mobile device.

15. The enclosure of claim 14 further including a mobile device.

16. A mobile device protection system comprising:
   an upper cover having an inner upper cover and an outer upper cover,
   a lower cover; and
   a hinge mechanism providing for axial movement and rotational movement of the upper cover in relation to the lower cover, the hinge mechanism comprising:
      a first assembly positioned on the inner upper cover, and
      a second assembly comprising a hinge joint arranged to receive a locking bar affixed to a first edge of the lower cover proximate to a first edge of the upper cover,
   wherein the first assembly and the second assembly are dimensionally arranged for the second assembly to be received by the first assembly, rotatably joined and in mechanical communication by the locking bar, and
   wherein the hinge mechanism includes a slidable lock of the first assembly moveably positioned with a plurality of rails under the outer upper cover providing for axial movement of the upper cover.

17. The system of claim 16, wherein a compartment space inside the mobile device protection system accommodates any of a battery, charging electronics, a communication device, a networking device, a computing device, a health care device, sensors, a gaming device, and a storage device.

18. The system of claim 16, wherein any of one or more components are nested, integrated, combined or co-located with the mobile device.

* * * * *